March 8, 1966  H. M. L. BOSTEELS  3,239,120
SEMI-AUTOMATIC WIRE FEEDER HAVING INTERCHANGEABLE GEARS
Filed Dec. 13, 1962  5 Sheets-Sheet 1

Fig. 3.

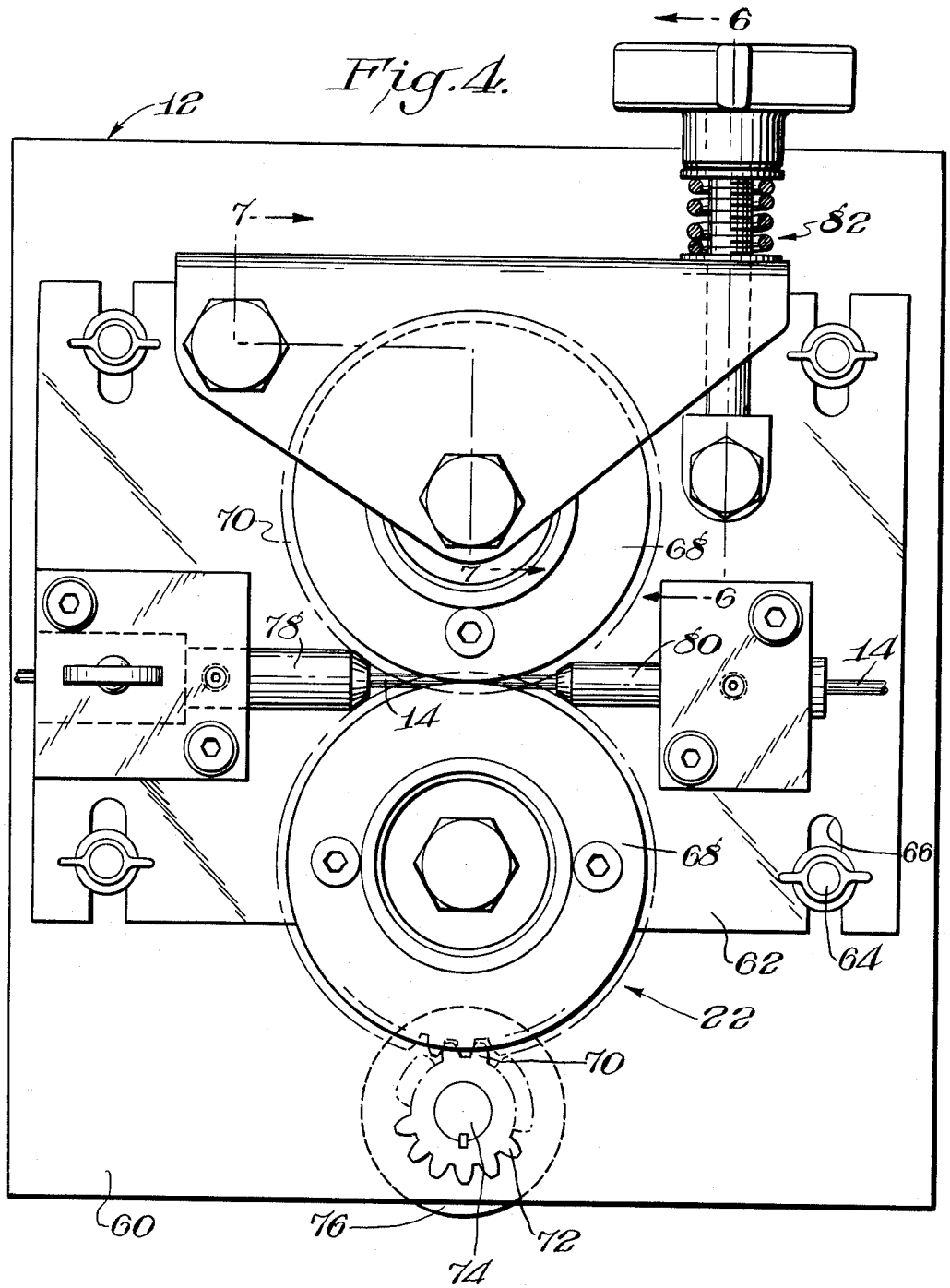

March 8, 1966   H. M. L. BOSTEELS   3,239,120
SEMI-AUTOMATIC WIRE FEEDER HAVING INTERCHANGEABLE GEARS
Filed Dec. 13, 1962   5 Sheets-Sheet 5
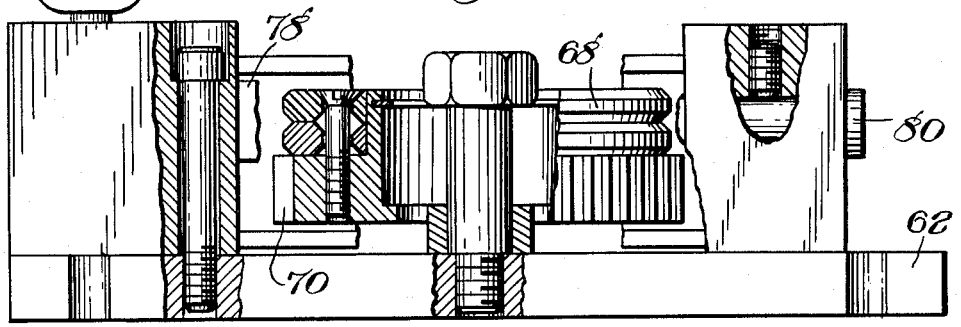
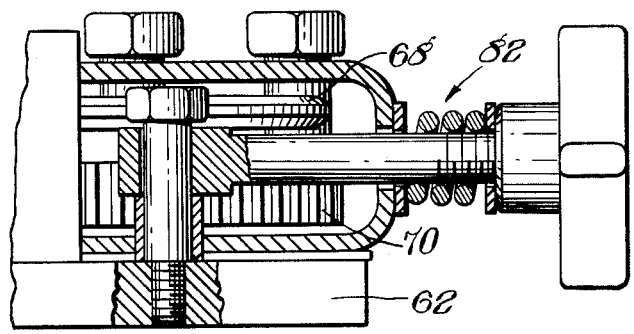
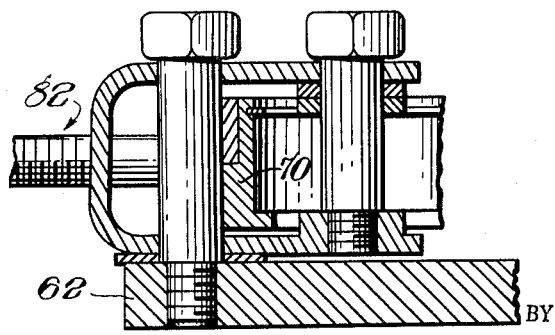

United States Patent Office 3,239,120
Patented Mar. 8, 1966

3,239,120
SEMI-AUTOMATIC WIRE FEEDER HAVING
INTERCHANGEABLE GEARS
Henri Marie Louis Bosteels, Lausanne, Switzerland, assignor to Central Welding Research Laboratories Limited, Hamilton, Bermuda, a corporation of Bermuda
Filed Dec. 13, 1962, Ser. No. 246,290
4 Claims. (Cl. 226—178)

This invention relates to an automatic welding system which may be converted from fully to semi-automatic operations, and it more particularly relates to structural, mechanical, thermal and electrical aspects of such a system.

Welding systems in which a wire electrode or filler wire are automatically fed are rapid and effective in operation. Such systems have been either fully automatic or semi-automatic, the latter requiring an operator to manipulate the welding torch. Such systems are quite complicated and expensive, and they have not been capable of alternative use. Users have therefore not found it worthwhile to invest in either of these types of systems unless they have had extensive use for each of them.

An object of this invention is to provide a compact and portable automatic welding system which is conveniently convertible from fully to semi-automatic operations.

Another object is to provide a unique wire preheating arrangement for such a system.

A further object is to provide such a system in which the speed of wire feeding can be conveniently varied; and Still a further object is to provide an electrical control arrangement for such a system in which contact arcing is minimized.

In accordance with this invention wire feeding and control components of an automatic welding system are detachably mounted upon a self-propelled carrier. When this component is detached from the carrier, it can easily be carried to relatively inaccessible welding locations. The speed of rotation of the wire feeding rollers is easily varied by mounting them and associated gearing upon an auxiliary plate which is movably mounted upon the detachable component thereby permitting a drive gear mounted upon the component to be conveniently changed. This highy facilitates the provision of varying gear ratios and speeds for the wire feeding rollers. When the wire feeding and control component is maintained attached to the carrier, it can be utilized in conjunction with an automatically-controlled torch also mounted upon the carrier in a fully automatic manner.

A very simple and economical means for preheating the welding electrode or wire is provided by incorporating a somewhat conductive tubular insert in the contact tip of the holder between the current conducting portions of the holder and the wire electrode being fed through it. This conducts the current to the electrode along a considerable portion of its length as it moves towards the welding arc and accordingly heats it to a temperature ranging approximately from 300 to 1600° F. before it is melted at the arc. This minimizes the heat required to melt the wire at the arc, and provides a greater deposition rate with no increase in amperage over that necessary without preheating.

A unique control arrangement for this system connects a voltage-sensitive relay across the power supply terminals which rapidly and positively opens and closes the wire-feeding motor contacts thereby minimizing the arcing across them and greatly preserving their life. This relay utilized is one which responds relatively precisely to changing voltage, such as one incorporating a semi-conductor.

Novel features and advantages of the present invention will become apparent to one skilled in the art from a reading of the following description in conjunction with the accompanying drawings wherein similar reference characters refer to similar parts and in which:

FIG. 3 is a schematic electrical diagram of another aspect of this invention;

FIG. 4 is a plan view of the wire feeding portion of the system shown in FIG. 1;

FIG. 5 is an end view in elevation partially broken away in cross section of a portion of FIG. 4; and FIGS. 6 and 7 are cross-sectional views taken through FIG. 4 along respective lines.

Figure 1:
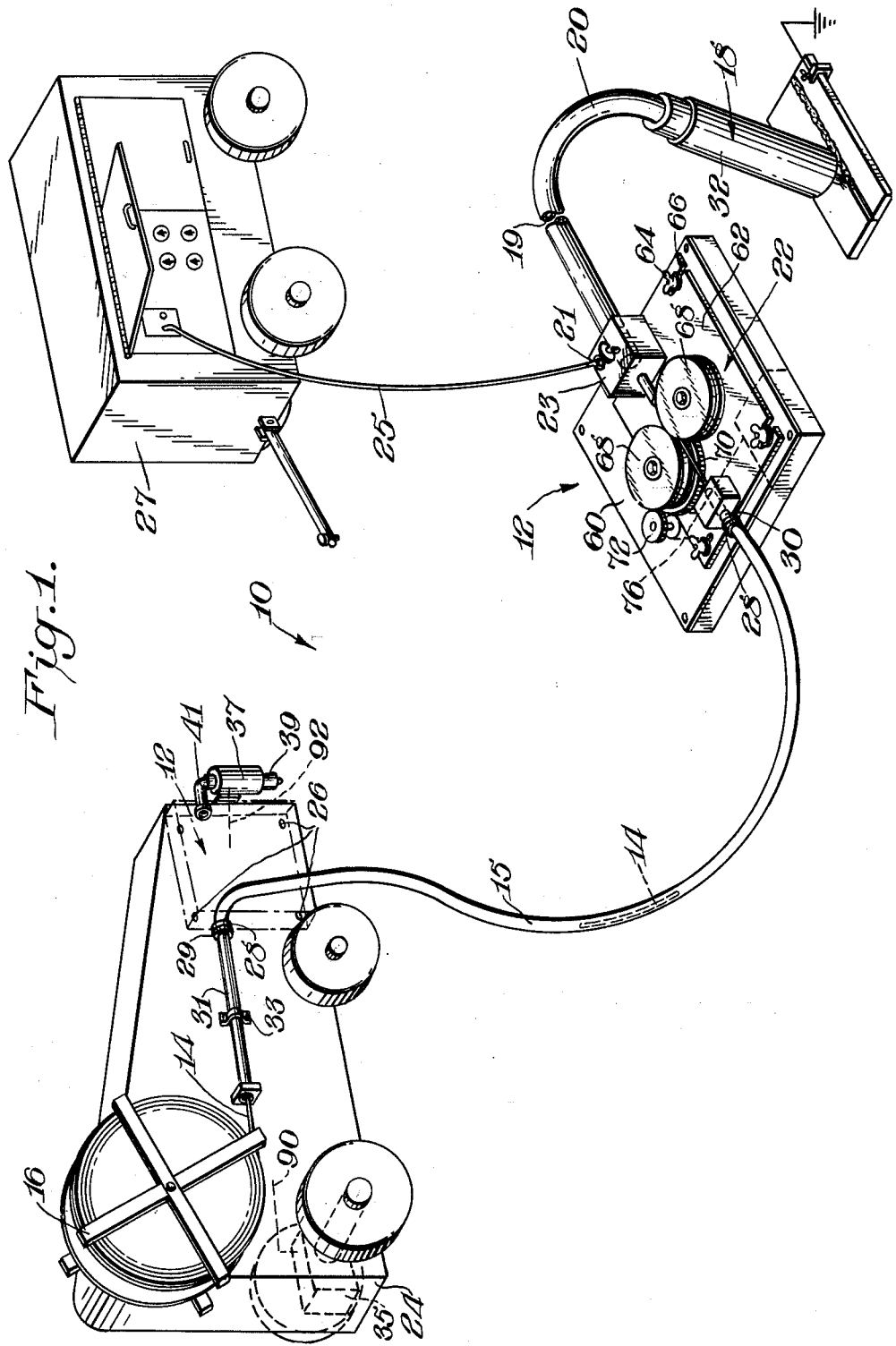
FIG. 1 is a three-dimensional view of separate parts of an embodiment of this invention.

In FIG. 1 is shown a convertible fully to semi-automatic welding system 10 incorporating a detachable welding wire-feeding and control component 12 which feeds a consumable electrode wire 14 supplied through a flexible hose 15 from a reel 16 to an arc welding torch 18 through a flexible conduit 20. Welding torch 18 draws its welding current through coiled annular conductor 19 within conduit 18 which is connected to terminal 21 at wire guide block 23 mounted on detachable component 12. Welding current cable 25 connects terminal 21 to generator 27. Wire-feeding and control component 12 incorporates a wire-feeding control unit 22. Wire-feeding and control component 12 and reel 16 can be both mounted upon carrier 24. However, in FIG. 1 only reel 16 is mounted upon carrier 24, and component 12 is detached from connecting sockets 26 and carried adjacent a cramped and relatively inaccessible welding location. Hose 15 is for example an extendable garden hose having couplings 28 which connect to couplings 29 and 30 on carrier 24 adjacent reel 16 and on detached component 12. When component 12 is mounted on carrier 24, conduit 31 secured to carrier 24 by bracket 33 conducts wire 14 between reel 16 and component 12.

The disposition of system 10 in FIG. 1 is for semi-automatic welding with control component 22 controlling wire-feeding motor 76, and torch 18 being held by an operator. For fully automatic welding with component 12 mounted upon carrier 24, control component 22 is also connected to wheel drive motor 35 by lead 90 and to adjusting mechanism 37 for automatic torch 39 mounted on the front of carrier 24 by lead 92. Adjusting mechanism 37 is any available automatic torch controlling device. Wire 14 is fed to automatic torch 39 through conduit 41, which is connected to wire guide block 23 of attached component 12. Torch adjusting mechanism 37 and torch 39 can also be attached to detached component 12 for fully automatic welding when the work is moved past component 12.

Figure 2:
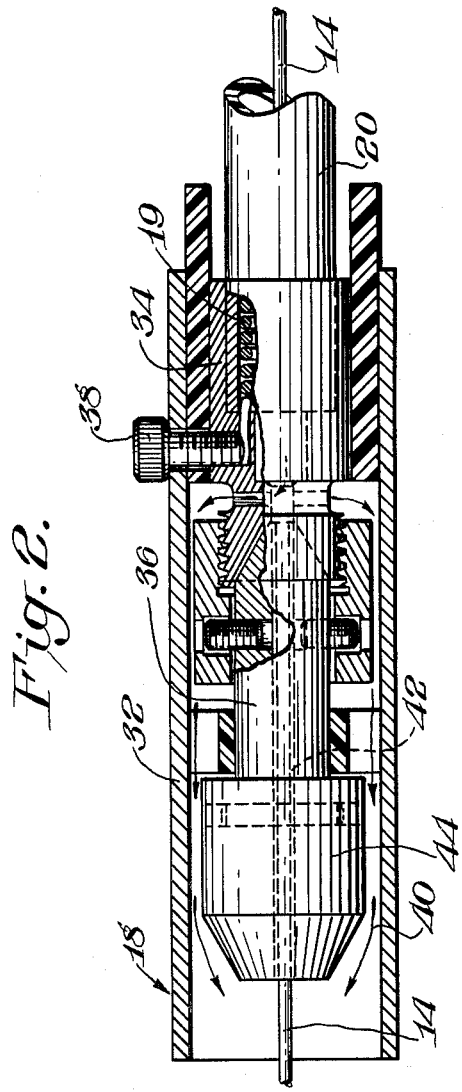
FIG. 2 is a cross-sectional view in elevation of a welding electric holder which incorporates one aspect of this invention.

In FIG. 2 is shown welding torch 18, which is for example of the gas-shielded type. Torch 18 incorporates a tubular shield 32 enclosing it, which is for example made of aluminum. Wire electrode 14 is fed through it from wire feeding and control component 12, and welding power is connected to the conductive elements 34 and 36 of holder 18, which are for example made of copper, by means of coiled annular copper conductor 19 connected to element 34 by insulated screw 38, for example, made of nylon. Gas is conducted through hose 20 and flows outwardly about the arc area as indicated by arrows 40.

A tubular sleeve or insert 42 of fairly conductive metal such as stainless steel is removably secured within wire guide 44 at the terminal part of holder 18. Electrode wire 14 bears in relatively close contact within insert 42, and the welding current is conducted through insert 42 along substantially its entire length to welding electrode wire 14 because the conductivity of insert 42 is not sufficient to conduct a heavy current through a limited area. The electric current provided to wire 14 within the insert causes wire 14 to heat up to a relatively high temperature and accordingly to preheat to a temperature of for example from 300 to 1600° F. This preheating lowers the ultimate heat necessary to melt the wire at the arc thereby increasing the deposition rate and causing a greater quantity of wire to be melted at the same applied amperage.

Figure 3:
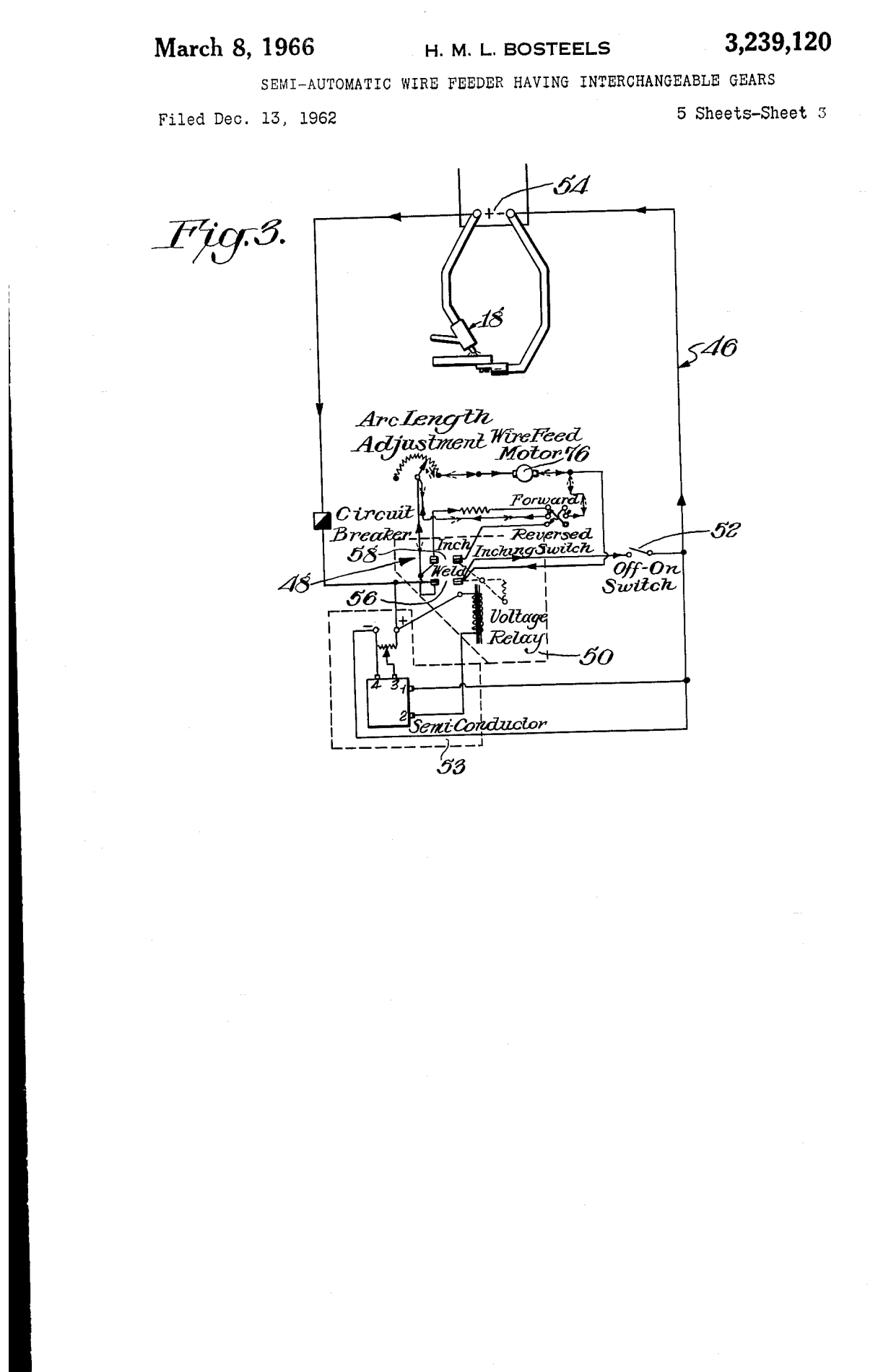

In FIG. 3 is shown a unique control system 46 for incorporation in control component 22 of FIG. 2 for controlling the wire-feeding contactors 48. System 46 incorporates a voltage-sensitive relay 50 which is connected through an on-and-off switch 52 across the welding power contacts 54. Relay 50 incorporates a voltage-sensitive semiconductor 53, which causes it to precisely open and close at a predetermined voltage such as fifty volts. Semiconductor 53 does not conduct fully until a low current flow heats it up, thereby making it fully conductive. This relay opens above fifty volts and closes when the voltage drops below fifty volts.

During the welding cycle at open circuit the voltage is for example 80 volts, and as soon as the weld arc is struck, the voltage drops to practically zero which positively and rapidly closes the relay. This immediately energizes the wire-feeding motor 76 through contacts 56 and opens contacts 58 in the inching circuit. This provides uniquely precise and positive actuation of the wire-feeding contacts thereby preventing any arcing, which occurs during the slower opening and closing provided by normal current-sensitive relays thereby greatly prolonging the length of life of the wire-feeding contacts.

In FIGS. 4–7 are shown operative portions of wire feeding component 12. Component 12 incorporates a base plate 60 upon which an auxiliary plate 62 is movably mounted by wingnuts 64 extending through slots 66 in auxiliary plate 62 and threaded into base plate 60. A pair of wire feeding rolls 68 are rotatably mounted upon auxiliary plate 62 together with associated gears 70 in meshing engagement. Gears 70 are rotated by pinion gear 72 secured to shaft 74 which extends through base plate 60 into engagement with an electric motor 76 hung under base plate 60. Wingnuts 64 and slots 66 permit the relative positions of spur gears 70 and shaft 74 to be varied thereby permitting different sized pinion gears 72 to be mounted on shaft 74. This facilitates the changing of the wire feeding speeds provided by wire component 12. Rolls 68 are maintained in firm engagement with a wire 14 threaded through tubular guides 78 and 80 by an adjustable spring tensioning assembly 82.

What is claimed is:

1. A variable speed wire-feeding arrangement comprising a base plate, a power-rotated shaft mounted upon said base plate, an auxiliary plate movably mounted to slide upon said base plate in a plane parallel to it, a pair of wire-feeding rolls and associated engaged spur gearing mounted upon said auxiliary plate, and a replaceable pinion gear mounted upon said shaft in engagement with one of said spur gears whereby various sizes of pinion gears may be mounted upon said shaft whose engagement is facilitated by said movable mounting for providing various wire-feeding speeds to said wire-feeding arrangement.

2. An arrangement as set forth in claim 1 wherein said auxiliary plate is movably mounted upon said base plate by means of slotted holes in said auxiliary plate and screwed fasteners connected to said base plate.

3. An arrangement as set forth in claim 2 wherein said wire feeding arrangement incorporates a resilient compressing device mounted upon said auxiliary plate and connected to said feed rolls for maintaining them in firm engagement with a wire electrode.

4. A variable speed wire-feeding arrangement comprising a flat base plate, a power-rotated shaft projecting from the flat side of said base plate, a flat auxiliary plate in contact with said flat side of said base plate and disposed adjacent said shaft, means movably mounting said auxiliary plate to slide upon said base plate in a plane parallel to it, said means including a plurality of slots in said auxiliary plate and fasteners extending through said slots into said base plate for movably securing said auxiliary plate to said base plate whereby said auxiliary plate may slide on said base plate to vary its position with respect to said shaft, a wire-feeding assembly including rolls and associated spur gearing mounting upon said auxiliary plate, and a replaceable pinion gear mounted upon said shaft in engagement in one of the spur gears of said wire-feeding assembly whereby various sizes of pinion gears may be selectively mounted upon said shaft whose engagement with the spur gear is facilitated by the movable mounting of said auxiliary plate for providing various wire-feeding speeds to said wire-feeding arrangement.

References Cited by the Examiner

UNITED STATES PATENTS

| | | | |
|---|---|---|---|
| 1,903,953 | 4/1933 | Anderson | 226—174 |
| 2,590,806 | 3/1952 | Vorderstrasse | 226—176 X |
| 2,735,309 | 2/1956 | Tew | 74—325 |
| 2,775,903 | 1/1957 | Reed | 74—325 |
| 2,790,925 | 4/1957 | Landis et al. | 314—69 |
| 2,826,927 | 3/1958 | Tiedemann | 74—325 |
| 2,900,489 | 8/1959 | Keener | 219—136 |
| 2,909,646 | 10/1959 | Russell | 219—130 |
| 2,931,890 | 4/1960 | Bernard | 219—130 |
| 2,981,453 | 4/1961 | Kinzelman | 226—199 |
| 2,981,825 | 4/1961 | Rundell | 219—136 |
| 3,021,420 | 2/1962 | Ruland et al. | 219—131 |
| 3,046,438 | 7/1962 | Elseth | 314—69 |
| 3,054,886 | 9/1962 | Allen et al. | 219—131 |
| 3,088,642 | 5/1963 | Kingsley | 226—176 X |

M. HENSON WOOD, JR., *Primary Examiner.*

JOSEPH V. TRUHE, ROBERT B. REEVES,
*Examiners.*